United States Patent [19]
Bell et al.

[11] Patent Number: 5,535,340
[45] Date of Patent: Jul. 9, 1996

[54] METHOD AND APPARATUS FOR MAINTAINING TRANSACTION ORDERING AND SUPPORTING DEFERRED REPLIES IN A BUS BRIDGE

[75] Inventors: D. Michael Bell, Beaverton; Mark A. Gonzales, Portland; Susan S. Meredith, Hillsboro, all of Oreg.

[73] Assignee: Intel Corporation, Santa Clara, Calif.

[21] Appl. No.: 247,026

[22] Filed: May 20, 1994

[51] Int. Cl.⁶ .................................................... G06F 13/00
[52] U.S. Cl. .......................... 395/292; 395/287; 395/308; 395/309
[58] Field of Search .................................. 395/325, 307, 395/309, 308, 287, 292

[56] References Cited

U.S. PATENT DOCUMENTS

| | | | |
|---|---|---|---|
| 5,124,981 | 6/1992 | Golding | 370/85.1 |
| 5,327,570 | 7/1994 | Foster et al. | 395/800 |
| 5,333,276 | 7/1994 | Solari | 395/325 |
| 5,369,748 | 11/1994 | McFarland et al. | |

OTHER PUBLICATIONS

"Access to a Public Switched Multi-Megabit Data Service Offering" Dix, Kelly, & Klessig Jul. 1990, Computer Communication Review, vol. 2, No. 3 pp. 46–61.
Val Popescu, et al., "The Metaflow Architecture", Jun. 1991, IEEE Micro, pp. 10–13 and 63–73.

Primary Examiner—Jack B. Harvey
Assistant Examiner—John Travis
Attorney, Agent, or Firm—Blakely, Sokoloff, Taylor & Zafman

[57] ABSTRACT

A bus bridge situated between two buses includes two queues: an outbound request queue and an inbound request queue. Requests originating on the first bus which target a destination on the second bus are placed into the outbound request queue. Decoding circuitry within the bridge issues a deferred response if the request can be deferred. This deferred response is returned to the originating agent on the first bus, thereby informing the originating agent that the request will be serviced at a later time. Bus control circuitry coupled to the outbound request queue removes requests from the outbound request queue and executes them on the second bus. The bus control circuitry receives a response from the destination agent on the second bus in response to the execution of the outbound request. This response is returned to the originating agent either immediately or after passing through an inbound request queue. Both the outbound request queue and the inbound request queue have data buffers associated therewith for transferring data between the two buses. In addition, requests may originate on the second bus which target a device on the first bus (i.e., inbound requests). These inbound requests are placed in the inbound request queue and are executed on the first bus when removed from the inbound request queue.

37 Claims, 8 Drawing Sheets

METHOD AND APPARATUS FOR MAINTAINING TRANSACTION ORDERING AND SUPPORTING DEFERRED REPLIES IN A BUS BRIDGE

BACKGROUND OF THE INVENTION

1. Field of the Invention

The present invention pertains to the field of data transfer in a computer system. More particularly, this invention relates to bus bridges which transfer information between multiple buses while maintaining transaction ordering and supporting deferred replies.

2. Background

Modern computer systems generally include multiple agents, such as microprocessors, storage devices, display devices, etc. which are interconnected via a system bus. The system bus operates to transfer address, data and control signals between these agents. Some modern computer systems employ multiple buses, in which various agents are coupled to one or more buses. Typically, each agent is coupled to a single bus.

Bus bridges are often utilized in multiple-bus systems to connect the buses and thereby allow agents coupled to one bus to access agents coupled to another bus. The function of the bridge typically involves transferring commands between two buses. The commands transferred by the bus bridge frequently have data associated with them (e.g., read or write commands).

One problem which frequently arises in computer systems with multiple agents is the need to preserve transaction ordering. Support for transaction ordering implies that if an agent writes to location A in memory followed by a write to location B in memory, another agent cannot read the new data in location B and stale (i.e., old) data in location A. A number of software algorithms require a producer-consumer relationship and thus depend on this support to ensure proper functionality. For example, in a system comprising multiple processors, assume that processor P1 is a producer of information and processor P2 is a consumer of information. P1 performs a write operation W1 to location 1 followed by a write operation W2 to location 2. Location 2 contains a flag variable that signals that the data in location 1 is valid. Processor P2 continuously performs a read operation R2 on location 2 until the flag becomes valid. After the flag is observed valid, P2 performs a read operation R1 on location 1 to read the data. In order for this algorithm to successfully execute in a multiprocessor system, the order in which W1 and W2 are written by processor P1 should be the same order in which R1 and R2 appear to be updated to processor P2.

A bus bridge in a multiple-bus system must address the problem of transaction ordering. In the example above, processors P1 and P2 may be coupled to one bus while locations 1 and 2 are coupled to a second bus, and a bus bridge is supporting access between the two buses. Thus, the bus bridge must ensure that transaction ordering is maintained. That is, the order in which W1 and W2 are written by an agent(s) should be maintained by the bus bridge.

One method of maintaining transaction ordering is shown in FIG. 1. A bus bridge 100 is shown which interfaces between two buses: a first system bus 102 and a second system bus 104. An agent 130 is coupled to system bus 102 and an agent 140 is coupled to system bus 104. In this system, bus bridge 100 contains a first queue 110 which contains requests issued on system bus 102 which target an agent on system bus 104. Bus bridge 100 also contains a second queue 115 which contains requests issued on system bus 104 which target an agent on system bus 102. A temporary storage buffer 120 may also be contained in bridge 100.

Bridge 100 transfers commands between buses 102 and 104. For example, assume agent 130 issues a request targeting agent 140. This request is received by bridge 100 and placed in queue 110. Alternatively, if agent 140 issues a request targeting agent 130, the request is placed in queue 115.

Data transferred between buses is stored in temporary storage buffer 120. For example, a read request placed into queue 110 is executed on system bus 104. When the target agent responds, the read data is placed in temporary storage buffer 120. The agent issuing the original request knows to look in temporary storage buffer 120 for the data to satisfy its request.

In the prior art system shown, both queues 110 and 115 contain pending requests and transfer the requests onto the appropriate buses. When a write request is issued by either agent 130 or agent 140, bridge 100 forces transaction ordering by preventing any read transactions from being placed in the opposite queue until the queue with the write request is flushed (i.e., the write transaction is executed on the targeted bus). For example, if a write operation were placed in queue 115, bridge 100 would prevent any read operations from being placed in queue 110 until queue 115 is flushed.

Although this prior art method effectively resolves the transaction ordering problem, it does not do so efficiently because it prevents the use of one queue while the other is being flushed. As described above, transactions are not placed in one queue while the other queue contains a write operation.

Thus, it would be advantageous to provide a system which resolves the transaction ordering problem in an effective and efficient manner. The present invention provides such a solution.

In addition, in many multiple-bus systems, if an agent on a first bus issues a request which targets an agent on a second bus, then the agent issuing the request waits for a reply from the agent on the second bus. During this waiting period, the agent may prevent other transactions from being issued on the first bus. Preventing other transactions from being issued on the first bus, however, reduces system performance because other agents cannot utilize the first bus during that time. Thus, it would be beneficial to provide a bridge which supports the requesting agent in waiting for a reply without preventing transactions from being issued on the first bus. The present invention provides such a solution.

SUMMARY OF THE INVENTION

The present invention comprises a method and apparatus for maintaining transaction ordering and supporting deferred replies in a bus bridge. The bus bridge comprises two interfaces for interfacing between two separate buses. Two queues are contained within the bus bridge: an outbound request queue and an inbound request queue. Requests originating on the first bus which target a destination on the second bus (termed "outbound requests") are input to decoding circuitry after being received by the interface to the first bus. The decoding circuitry issues a deferred response if the request can be deferred. This deferred response is returned to the originating agent on the first bus, thereby informing the originating agent that the request will be serviced at a later time. In response to the deferred response the originating agent releases control of the first bus, thus allowing other agents to utilize the first bus.

The decoding circuitry then transfers the outbound request into the outbound request queue. When the outbound request reaches the top of the outbound request queue, the request is executed on the second bus. The bus bridge receives a response from the destination agent on the second bus in response to the execution of the outbound request, which in turn is returned as a deferred reply to the agent originating the request on the first bus.

The entries in both the outbound request queue and the inbound request queue contain pointers to data buffers contained in the bridge. The data buffers contain data which must be passed between the first bus and the second bus, dependent on the specific command of the request. In addition, requests may originate on the second bus which target a device on the first bus (termed "inbound requests"). These inbound requests are placed in the inbound request queue and are executed on the first bus when removed from the inbound request queue.

BRIEF DESCRIPTION OF THE DRAWINGS

The present invention is illustrated by way of example and not limitation in the Figures of the accompanying drawings, in which like references indicate similar elements and in which.

DETAILED DESCRIPTION

In the following detailed description of the present invention numerous specific details are set forth in order to provide a thorough understanding of the present invention. However, it will be understood by one skilled in the art that the present invention may be practiced without these specific details. In other instances, well known methods, procedures, components, and circuits have not been described in detail so as not to obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
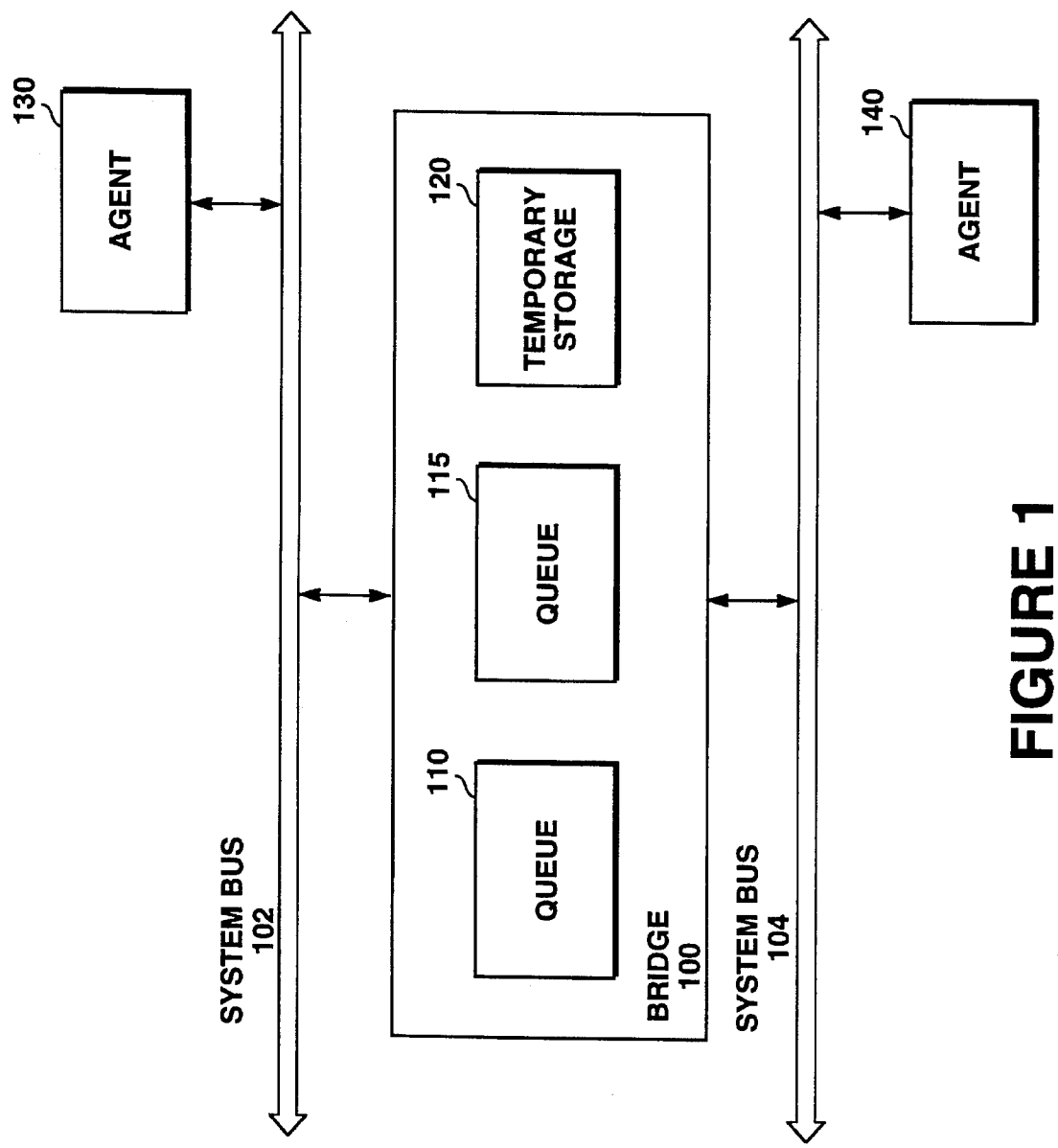
FIG. 1 is a block diagram of a prior art implementation of a bus bridge in a computer system.
Figure 2:
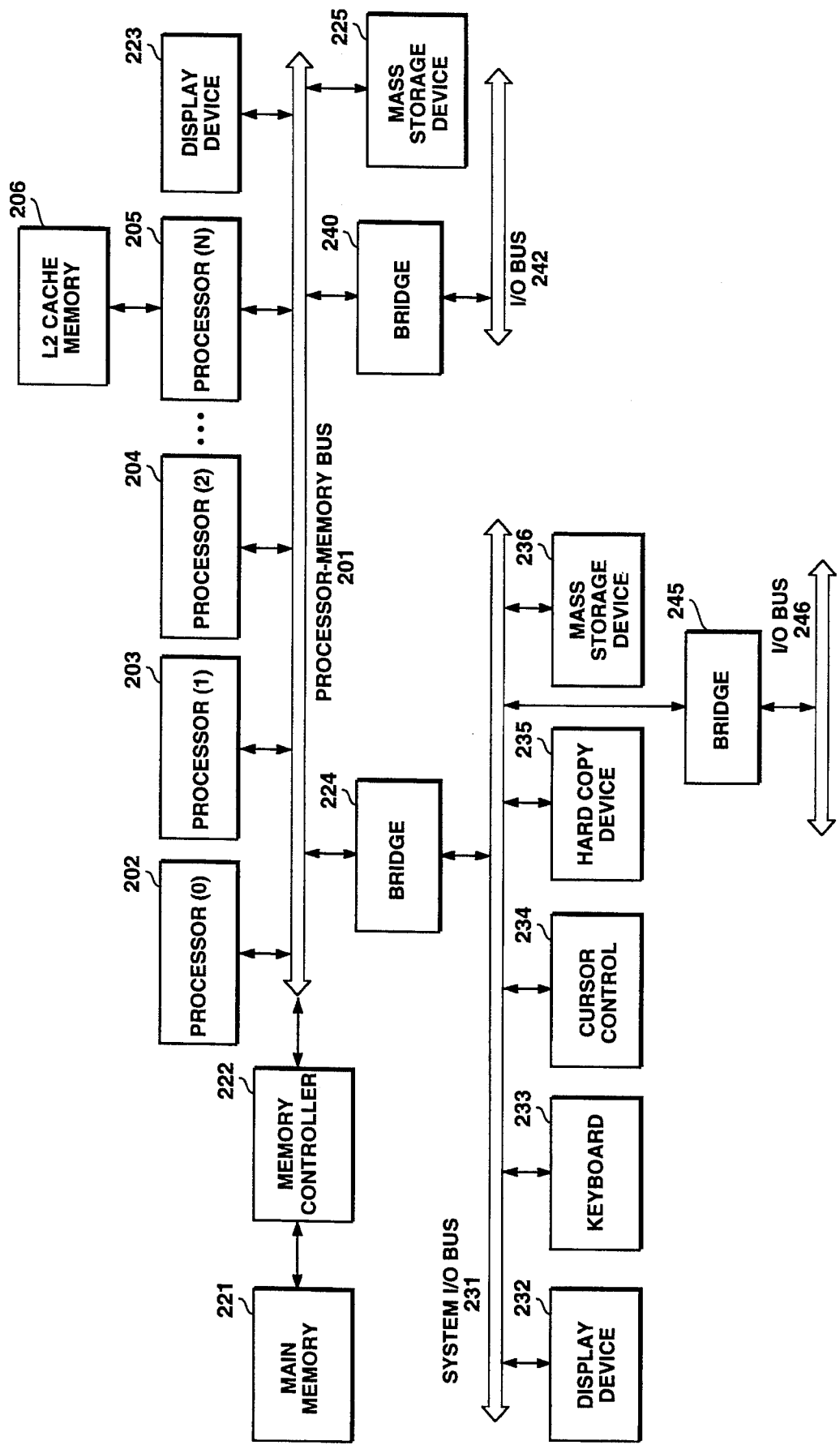
FIG. 2 shows an overview of an exemplary multiprocessor computer system of the present invention.

FIG. 2 shows an overview of an example multiprocessor computer system of the present invention. The computer system generally comprises a processor-memory bus or other communication means 201 for communicating information between one or more processors 202, 203, 204 and 205. Processor-memory bus 201 includes address, data and control buses. Processors 202 through 205 may include a small, extremely fast internal cache memory, commonly referred to as a level one (L1) cache memory for temporarily storing data and instructions on-chip. In addition, a bigger, slower level two (L2) cache memory 206 can be coupled to a processor, such as processor 205, for temporarily storing data and instructions for use by processor 205. In one mode, the present invention includes Intel® architecture microprocessors as processors 202 through 205; however, the present invention may utilize any type of microprocessor architecture, or any of a host of digital signal processors.

Processor 202, 203, or 204 may comprise a parallel processor, such as a processor similar to or the same as processor 205. Alternatively, processor 202, 203, or 204 may comprise a co-processor, such as a digital signal processor. In addition, processors 202 through 205 may include processors of different types.

The processor-memory bus 201 provides system access to the memory and input/output (I/O) subsystems. A memory controller 222 is coupled with processor-memory bus 201 for controlling access to a random access memory (RAM) or other dynamic storage device 221 (commonly referred to as a main memory) for storing information and instructions for processors 202 through 205. A mass data storage device 225, such as a magnetic disk and disk drive, for storing information and instructions, and a display device 223, such as a cathode ray tube (CRT), liquid crystal display (LCD), etc., for displaying information to the computer user may be coupled to processor-memory bus 201.

An input/output (I/O) bridge 224 may be coupled to processor-memory bus 201 and system I/O bus 231 to provide a communication path or gateway for devices on either processor-memory bus 201 or I/O bus 231 to access or transfer data between devices on the other bus. Essentially, bridge 224 is an interface between the system I/O bus 231 and the processor-memory bus 201.

In addition, an I/O bus 242 may be coupled to processor-memory bus 201 via bridge 240. I/O bus may be coupled to additional peripheral devices, such as devices 232 through 236 coupled to system I/O bus 231.

In one embodiment of the present invention I/O bus 246 is coupled to system I/O bus 231 via bridge 245. I/O bus may be coupled to additional peripheral devices, such as devices 232 through 236 coupled to system I/O bus 231. In one mode, I/O bus 246 operates on a different standard (e.g., EISA) than system I/O bus 231 (e.g., PCI).

I/O bus 231 communicates information between peripheral devices in the computer system. Devices that may be coupled to system bus 231 include a display device 232, such as a cathode ray tube, liquid crystal display, etc., an alphanumeric input device 233 including alphanumeric and other keys, etc., for communicating information and command selections to other devices in the computer system (e.g., processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions may also be coupled to system bus 231.

In some implementations, it may not be required to provide a display device for displaying information. Certain implementations of the present invention may include additional processors or other components. Additionally, certain implementations of the present invention may not require nor include all of the above components. For example, processors 202 through 204, display device 223, I/O bus 242, or mass storage device 225 may not be coupled to processor-memory bus 201. Furthermore, some of the peripheral devices shown coupled to system I/O bus 231 may be coupled to processor-memory bus 201.

In the present invention, bus transactions occur on the processor buses (e.g., processor-memory bus 201 of FIG. 2) in the computer system in a pipelined manner. That is, multiple bus transactions may be pending at the same time, wherein each is not fully completed. Therefore, when a requesting agent begins a bus transaction by driving an address onto the bus, the bus transaction may be only one of a number of bus transactions currently pending. Although bus transactions are pipelined, the bus transactions in the present invention do not have to be fully completed in order, such that the present invention performs deferred transactions. Therefore, the present invention allows for completion replies to requests to be out-of-order. An example bus protocol for out-of-order replies is described in U.S. patent application Ser. No. 08/085,541, filed Jun. 30, 1993, entitled "Method and Apparatus for Performing Bus Transactions in a Computer System".

The present invention accommodates for deferred transactions by essentially splitting a bus transaction into two independent transactions. The first transaction involves a request for data (or completion signals) by a requesting agent and a response by the responding agent. The request may be comprised of the sending of an address on the address bus and a first token. The response may include the sending of the requested data (or completion signals) if the responding agent is ready to respond. In this case, the bus transaction ends. However, if the responding agent is not ready to supply the request (i.e., the data or completion signals), the response may include the sending of a second token. In this case, the second transaction comprises the resending of the second token with the requested data (or completion signals) by the responding agent to the requesting agent, such that the requesting agent receives the originally requested data to complete the transaction.

If the responding agent is not ready to complete the bus transaction, then the responding agent sends a deferred response over the bus at its appropriate response time. The requesting agent receives the deferred response. When the responding agent is ready to complete the deferred bus transaction, the responding agent arbitrates for ownership of the bus. Once bus ownership is obtained, the responding agent sends a deferred reply including a second token on the bus. The requesting agent monitors the bus and receives the second token as part of the deferred reply. In the present invention, the requesting agent latches the second token. The requesting agent then determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token front the responding agent does match the first token, then the data on the bus (or the completion signals) is the data originally requested by the requesting agent and the requesting agent latches the data on the data bus.

In one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. A transaction is the set of bus activities related to a single request, from request bus arbitration through response-initiated data transfers on the data bus. In this embodiment, a transaction is the set of bus activities related to a single request, from request bus arbitration through response-initiated data transfers on the data bus.

A transaction contains up to six distinct phases. However, certain phases are optional based on the transaction and response type. A phase uses a particular signal group to communicate a particular type of information. These phases are:

Arbitration Phase
Request Phase
Error Phase
Snoop Phase
Response Phase
Data Transfer Phase In one mode, the Data Transfer Phase is optional and used if a transaction is transferring data. The data phase is request-initiated, if the data is available at the time of initiating the request (e.g., for a write transaction). The data phase is response-initiated, if the data is available at the time of generating the transaction response (e.g., for a read transaction). A transaction may contain both a request-initiated data transfer and a response-initiated data transfer.

Figure 3:
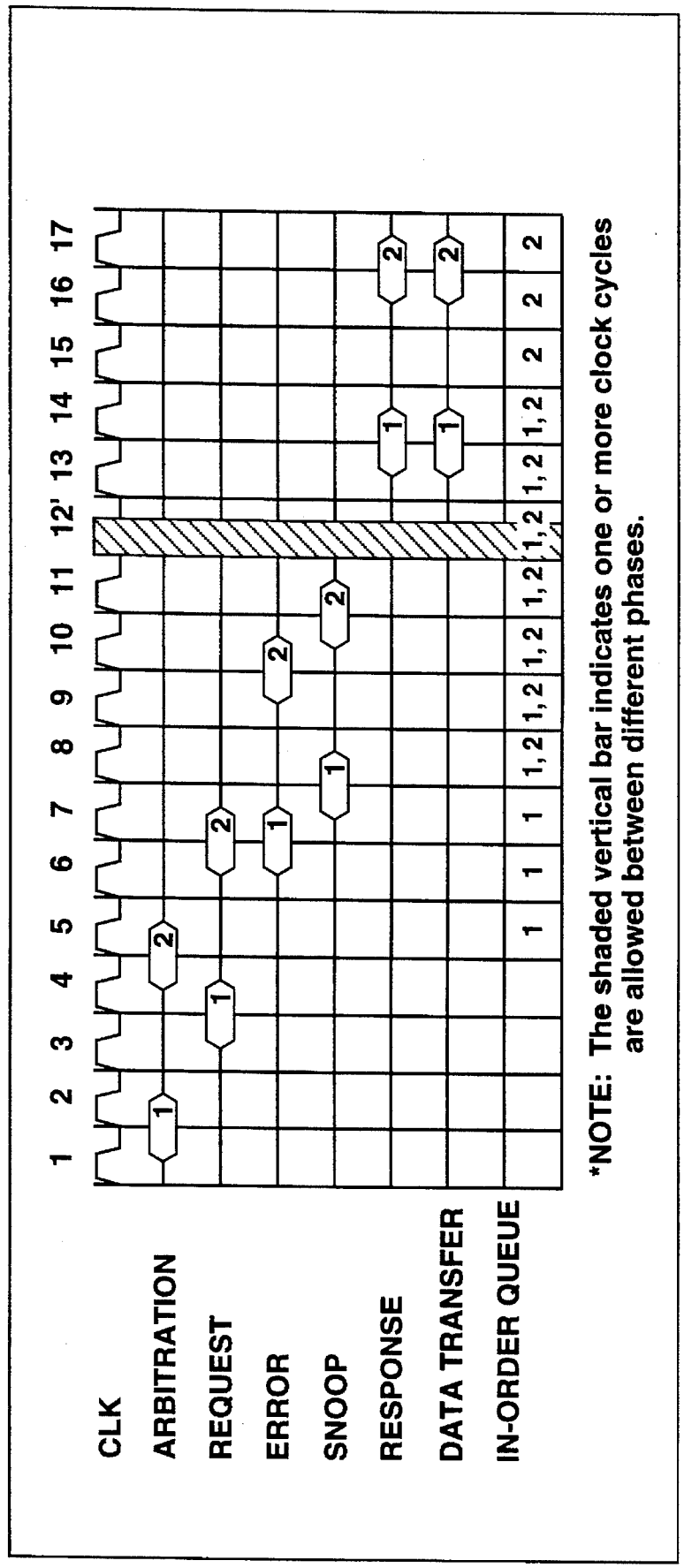
FIG. 3 is a timing diagram of two bus transactions for one embodiment of the present invention.

Different phases from different transactions can overlap, thereby pipelining bus usage and improving bus performance. FIG. 3 shows exemplary overlapped request/response phases for two transactions. Referring to FIG. 3, every transaction begins with an Arbitration Phase, in which a requesting agent becomes the bus owner. The second phase is the Request Phase in which the bus owner drives a request and address information on the bus. After the Request Phase, a new transaction enters a first-in-first-out (FIFO) queue, the In-Order Queue. All bus agents, including the requesting agent, maintain identical In-Order Queues and add each new request to those queues. In FIG. 3 for example, request 1 is driven in CLK3, observed in CLK4, and in the In-Order Queue beginning in CLK5. The third phase of a transaction is an Error Phase, three clocks after the Request Phase. The Error Phase indicates any immediate errors triggered by the request. The fourth phase of a transaction is a Snoop Phase, four or more clocks from the Request Phase. The Snoop Phase indicates if the cache line accessed in a transaction is valid or modified (dirty) in any agent's cache. The Snoop Phase also indicates whether a transaction will be completed in-order or may be deferred for possible out-of-order completion.

Transactions proceed through the In-Order Queue in FIFO order. The topmost transaction in the In-Order Queue enters the Response Phase. The Response Phase indicates whether the transaction failed or succeeded, whether the response is immediate or deferred, and whether the transaction includes data phases.

If a transaction contains a response-initiated data phase, then it enters data transfer along with the response phase, the transaction is removed from the In-Order Queue at the completion of its Response Phase and (an optional) response-initiated Data Transfer Phase. As shown in FIG. 3, transaction 1 is removed from the In-Order Queue effective in CLK15.

Due to the split-transaction nature of the bus described above, it can be seen that multiple transactions may be outstanding at any given time. That is, multiple requests may have been issued for which no replies have been returned. In one embodiment of the present invention, each agent on the bus can have tip to eight transactions outstanding.

Figure 4:
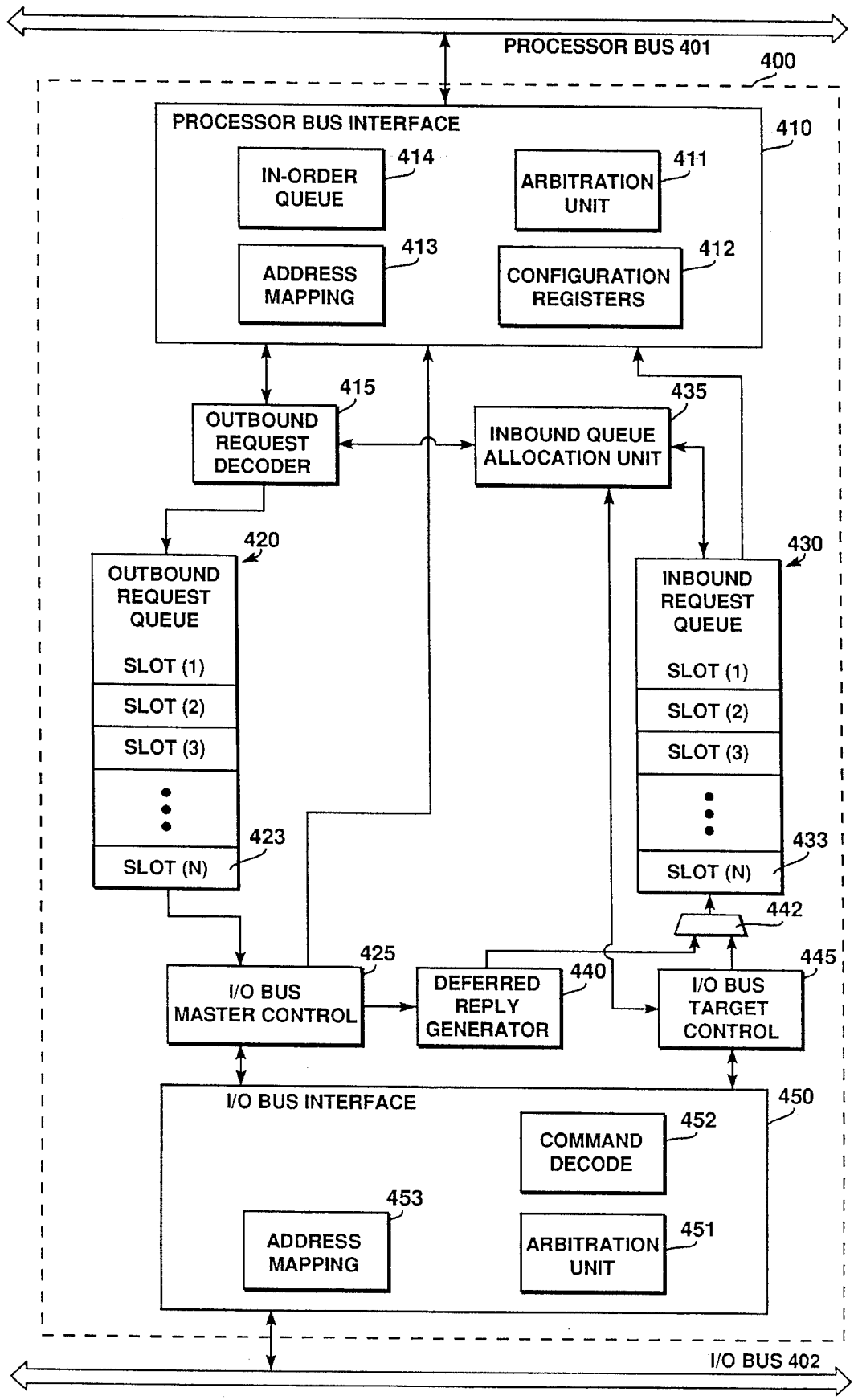
FIG. 4 is a diagram of the bus bridge of one embodiment of the present invention.

FIG. 4 is an exemplary block diagram of the bus bridge of one embodiment of the present invention. In one mode, bus bridge 400 of FIG. 4 is bridge 224 or 240 of FIG. 2. In one embodiment of the present invention, I/O bus 402 operates according to the well-known PCI bus standard. However, it should be noted that I/O bus 402 may operate according to any of a wide variety of standards, such as the well-known EISA, ISA, or VESA bus standards.

In the discussion to follow, bus bridge 400 is discussed as being connected to a processor bus and an I/O bus. It should be understood by those skilled in the art, however, that the examples and embodiments discussed below apply equally to interconnect any two buses, not only a processor bus and an I/O bus.

Bus bridge 400 includes processor bus interface 410 coupled to processor bus 401. Processor bus 401 may be for example, bus 201 of FIG. 2. Processor bus interface 410 is also coupled to an outbound request decoder 415, an I/O bus master control unit 425, and an inbound request queue 430. Bus interface 410 receives requests from processor bus 401 which target either the bridge or agents on I/O bus 402.

Bus interface 410 includes an arbitration unit 411, In-Order Queue 414, and configuration registers 412. Arbitration unit 411 controls bus bridge 400's arbitration for access to processor bus 401. The arbitration for access to processor bus 401 may be performed in any of a wide variety of conventional manners. Configuration registers 412 provide configuration values for bridge 400's operation within the computer system. These values include, for example, whether write posting is enabled or disabled, whether deferred replies are enabled or disabled, etc. Enabling of write posting and deferred replies is discussed in more detail below.

In-Order Queue 414 is used by bridge 400 to monitor a list of currently pending transactions on the processor bus. As discussed above, a transaction on the processor bus enters In-Order Queue 414 after the Request Phase and is removed after completion of the Response Phase (or Data Transfer Phase, if it exists).

In one embodiment of the present invention, bus interface 410 also includes address mapping logic 413. In systems where processor bus 401 and I/O bus 402 use different standards, the addresses associated with requests may need to be translated. That is, a request from i/O bus 402 may target an address which is not in the proper format to be placed on processor bus 401. Address mapping logic 413 performs this translation. The translation is based on the standards of the two buses and is performed in a conventional manner.

Requests are issued on processor bus 401 by an originating agent. The originating agent may generate these requests, or alternatively the originating agent may be another interface or bridge which is merely transferring the request to processor bus 401. Regardless of where a request originates, when bus interface 410 receives the request it immediately transfers the request to outbound request decoder 415. Outbound request decoder 415 determines whether the request will be deferred, as described in more detail below. After making this determination outbound request decoder 415 issues a signal to bus interface 410 indicating whether or not the request is deferred. If the request is deferred, then bus interface 410 returns a response to the agent which placed the request on processor bus 401; this response indicates that the request is deferred. If, however, the request is not deferred, then bus interface 410 stalls processor bus 401 until the request is completed. By "stalling" it is meant that no transactions are passed over the bus until the stall is released. In one mode, stalling the bus is accomplished by sending a signal to all agents on the bus that the bus should be stalled.

In one embodiment of the present invention, processor bus 401 is a pipelined bus. Thus, if a request is not deferred, the entire bus does not necessarily need to be stalled. In one mode, bridge 400 stalls the Response Phase of the bus when the request is not deferred. By stalling the Response Phase, other phases of the pipeline bus are allowed to continue for other transactions while the current request is pending. For example, other agents can place requests on the bus and some result signals (e.g., error signals) can be issued, however no responses are issued until bridge 400 releases the stall on the Response Phase.

In one mode, bus interface 410 completely stalls processor bus 401 if the outbound request queue 420 is filled. That is, when no remaining slots exist in the outbound request queue 420, bus interface 410 issues a signal on processor bus 401 to completely stall the pipeline. By completely stalling the bus, no additional transactions can occur on processor bus 401 in any phase until a slot in the outbound request queue 420 becomes available. At such a time, bus interface 410 releases the stall on processor bus 401.

In this mode, bus interface 410 stalls processor bus 401 if all slots in the outbound request queue 420 are filled. In some situations, however, the nature of the pipelined bus is such that a second request could already be on the bus when a prior request is placed in the last available slot of outbound request queue 420. Thus, a problem arises if the second request also targets the bridge 400 because no slot in the outbound request is available. To resolve this problem, bus interface 410 stalls processor bus 401 when only one slot remains in outbound request queue 420.

In an alternate mode, bus interface 410 issues retry responses when outbound request queue 420 is full rather than stalling processor bus 401. Thus, transactions which do not target bridge 400 proceed over processor bus 401, however transactions which target bridge 400 must be retried.

In addition to transferring requests from processor bus 401 to outbound request decoder 415, bus interface 410 also returns responses from target agents on I/O bus 402 to the originating agent on processor bus 401. Furthermore, requests originating on I/O bus 402 targeting agents on processor bus 401 are placed on processor bus 401 by interface 410.

Processor bus interface 410 receives the reply to a request targeting an agent on I/O bus 402 through either I/O bus master control unit 425 or the inbound request queue 430, as described in more detail below. In addition, requests originating on I/O bus 402 also pass to bus interface 410 via inbound request queue 430. Bus interface 410 determines whether a reply will be returned from I/O bus master control unit 425 or inbound request queue 430 based on the signal received from outbound request decoder 415 which signaled whether or not the request was deferred. If the request is not deferred, then the reply is returned to bus interface 410 via I/O bus master control 425. Bus interface 410 then executes the reply on processor bus 401 and releases the stall of the Response Phase. However, if the request is deferred, or if the request originated on I/O bus 402, then bus interface 410 receives the reply (or request) via inbound request queue 430.

Inbound request queue 430 transfers requests and deferred replies from I/O bus 402 to processor bus 401. In one mode, when a transaction is at the top of inbound request queue 430, queue 430 sends a signal to processor bus interface 410 indicating so. When processor bus interface 410 receives this signal it begins arbitration for access to processor bus 401. When access to processor bus 401 is obtained, bus interface 410 retrieves transactions from the inbound request queue 430 and executes them on processor bus 401.

In one embodiment, processor bus interface 410 is a high priority agent on processor bus 401. Thus, when transactions are pending in the inbound request queue 430, bus interface 410 is able to quickly access processor bus 401 and execute the pending transactions on the bus. In one mode, once bus interface 410 obtains access to processor bus 401 all pending transactions in the inbound request queue are removed from the queue and executed on the bus. It should be noted that under certain circumstances, bus interface 410 may not be able to successfully remove all transactions pending in the inbound request queue 430 and execute them on processor bus 401 prior to bus interface 410 relinquishing ownership of processor bus 401. That is, a delay time may be incurred in moving commands forward in the queue. For example, if the queue contains four transactions, the first three may be successfully executed on processor bus 401. However, the fourth transaction may not propagate to the top of the queue quickly enough, causing bus interface 410 to mistakenly believe no transactions are pending in the queue.

In an alternate embodiment, rather than executing all transactions pending in the inbound request queue 430, bus interface 410 arbitrates for access to processor bus 401 and executes a single transaction from the inbound request queue 430 on processor bus 401. If transactions remain pending in the queue, then bus interface 410 again arbitrates for access to processor bus 401.

Outbound request decoder 415 determines whether a request on processor bus 401 is to be deferred. Outbound request decoder 415 is coupled to bus interface 410, outbound request queue 420, and inbound queue allocation unit 435. In order to defer a request, outbound request decoder 415 determines whether a slot is available in the inbound request queue 430. If a slot in the inbound request queue 430 is not available, then issuing a defer response to bus interface 410 could result in a deadlock situation, as described in more detail below.

Outbound request decoder 415 accesses inbound queue allocation unit 435 to determine whether a slot in the inbound request queue 430 is available. Inbound queue allocation unit 435 dynamically allocates inbound request queue slots, as described in more detail below. If inbound queue allocation unit 435 informs outbound request decoder 415 that a slot in the inbound request queue is available, then decoder 415 reserves the slot and informs allocation unit 435 that it has done so. By reserving a slot in the inbound request queue 430, decoder 415 guarantees that when the reply comes back from I/O bus 402 a slot in the inbound request queue exists for the reply to be placed.

Regardless of whether the request has been deferred, decoder 415 places the request into the outbound request queue 420. Decoder 415 tags the outbound request in the outbound request queue if the request has been deferred. It should be noted that even if a request placed in the outbound request queue 420 is not deferred, a subsequent request may be deferred. That is, a slot in the inbound request queue may not be available for a deferred response for a particular request, however by the time a subsequent request arrives at decoder 415 a slot in the inbound request queue 430 may have been freed; thus, decoder 415 can issue a deferred reply for the subsequent request.

Outbound request queue 420 receives requests front decoder 415 and transfers these requests to I/O bus master control unit 425. In one embodiment, outbound request queue 420 is a first in-first out (FIFO) buffer which operates in a conventional manner. Thus, requests placed in outbound request queue 420 arc, removed from the queue by I/O bus master control 425 in a first in-first out manner. By maintaining a FIFO queue, bridge 400 maintains transaction ordering. That is, a request placed in the outbound request queue 420 will be removed from the queue 420 and executed on I/O bus 402 before any subsequent request are removed.

It will be understood by those skilled in the art that by utilizing deferred responses, under certain circumstances a read request could receive a reply on processor bus 401 before prior requests pending in the inbound request queue 430 are satisfied. For example, if two deferred read requests are in outbound request queue 420, and a maximum of two deferred reads can exist in outbound request queue 420, then a subsequent third read request entering bridge 400 will not be deferred. These first two read requests are executed on I/O bus 402 and placed in the inbound request queue 430. The third request is then executed on I/O bus 402 and the reply is immediately returned to bus interface 410 and executed on processor bus 401. Thus, the third read request is satisfied before the two prior read requests are satisfied.

From this example it can be seen that transaction ordering is still maintained. The transactions are executed on I/O bus 402 in the order they are received by the bridge 400. The responses are not necessarily in order over processor bus 401, however, as described above.

Figure 6:
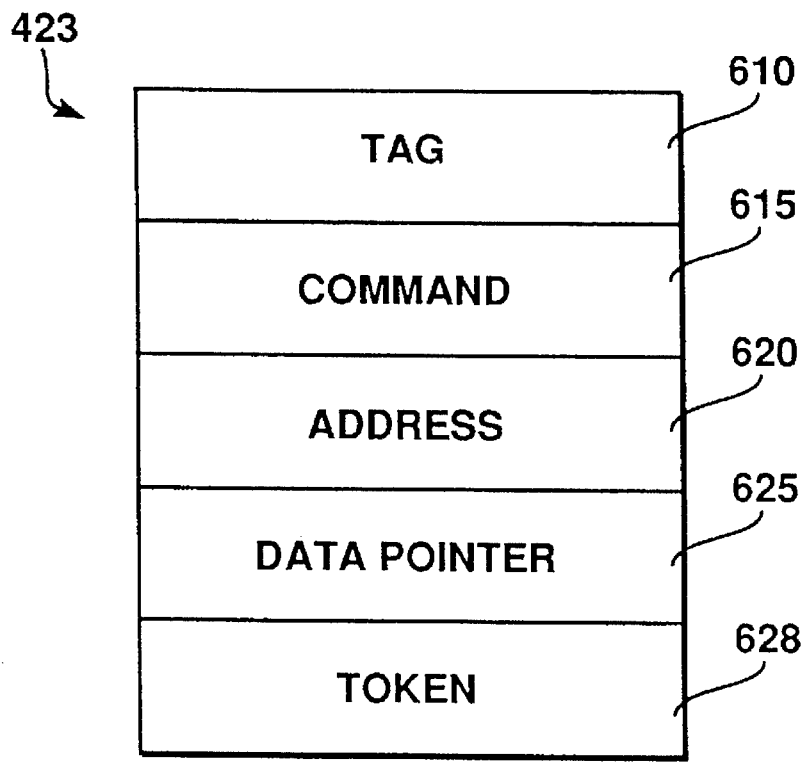
FIG. 6 is a diagram showing the contents of a slot within the outbound queue of one embodiment of the present invention.

In one embodiment, outbound request queue 420 is comprised of multiple slots. In one mode, outbound request queue 420 contains four of these slots. An exemplary slot is shown in more detail in FIG. 6. The exemplary outbound queue slot 423 is comprised of five sections. These sections are: a tag 610, a command portion 615, an address portion 620, a data pointer 625, and a token portion 628.

In one embodiment of the present invention, tag 610 comprises 1 bit, command portion 615 comprises 4 bits, address portion 620 comprises 32 bits, data pointer 625 comprises 2 bits, and token portion 628 comprises 8 bits. However, it should be understood by those skilled in the art that these values may be changed. For example, in a bridge with four data buffers, data pointer 625 may be only 2 bits, however in a bridge with six data buffers data pointer 625 would be at least 3 bits.

Tag 610 indicates whether the request stored in slot 423 is deferred. Tag 610 is set by decoder 415 when the request stored in slot 423 is deferred, as described above. Command portion 615 contains the actual command which was issued by the originating agent on processor bus 401. In one embodiment, commands in outbound request queue 420 are as issued on processor bus 401. That is, no translation of commands is performed by either bus interface 410 or decoder 415.

Slot 423 also contains an address portion 620. Address portion 620 contains the address of the target agent on I/O bus 402 (or a location within a target agent on I/O bus 402) which is the target for the command in command portion 615. Slot 423 also contains a data pointer 625. If the request requires transferring data from processor bus 401 to I/O bus 402 then data pointer 625 is a pointer to a data buffer which contains the data being transferred. In one implementation, data pointer 625 contains the address of the data buffer associated with this particular slot.

The use of data buffers in association with outbound request queue 420 is described in more detail below with respect to FIG. 5. It should be noted that under certain circumstances the request originating on processor bus 401 has no data associated with it. For example, the original request may be a special command to an agent on I/O bus 402 or a command broadcast to many agents on I/O bus 402; in such a situation, data pointer 625 would point to no data buffer.

Returning to FIG. 4, I/O bus master control 425 takes requests from the outbound request queue 420 one at a time. After removing a request from the queue 420, I/O control 425 transfers the request to I/O bus interface 450. I/O control 425 does not remove subsequent requests from outbound request queue 420 until it receives a response from I/O bus interface 450 for this request.

Upon receiving a reply from I/O bus interface 450, I/O control 425 returns the reply to bus interface 410. This may be done either directly or via inbound request queue 430. Whether I/O control 425 returns the reply directly to bus interface 410 is dependent on whether the request is deferred by decoder 415. If the request is deferred, then I/O bus master control 425 transfers the reply to deferred reply generator 440. If, however, the request is not deferred, then I/O control 425 returns the reply directly to bus interface 410. It should be noted that I/O control 425 returns a reply directly to bus interface 410 if the request is not deferred because, as described above, bus interface 410 stalled the Response Phase of processor bus 401 in response to the request not being deferred. By returning the reply immediately, processor bus 401 is stalled for a minimal amount of time.

It should also be noted that the reply transferred by I/O control 425 may be a "retry" response. That is, if the target agent on I/O bus 402 is unable to complete the request then it issues a retry response to bus interface 450 which is returned to I/O control 425. This retry response is returned to the originating agent on processor bus 401, via bus interface 410, indicating to the originating agent that it must retry the request again at a later time.

I/O bus interface 450 is coupled to I/O bus master control unit 425, I/O bus target control 445, and I/O bus 402. Bus interface 450 receives requests from both I/O control unit 425 and I/O bus 402. Requests received from I/O bus master control 425 are those requests originating on processor bus 401, as described above. Upon receipt of such a request, bus interface 450 executes the command associated with the request on I/O bus 402. In one embodiment of the present invention, processor bus 401 and I/O bus 402 utilize different protocols. Thus, commands issued on processor bus 401 must first be translated before being executed on I/O bus 402. In one mode, command decode 452 in I/O bus interface 450 performs this translation. This translation may be performed using any of a wide variety of techniques understood by those skilled in the art.

I/O bus interface 450 also includes an arbitration unit 451. Arbitration unit 451 controls bus bridge 400's arbitration for access to I/O bus 402. The arbitration for access to I/O bus 402 may be performed in any of a wide variety of conventional manners.

In one embodiment of the present invention, I/O bus interface 450 also includes address mapping logic 453. In systems where processor bus 401 and I/O bus 402 use different standards, the addresses associated with requests may need to be translated. That is, a request from processor bus 401 may target an address which is not in the proper format to be placed on I/O bus 402. Address mapping logic 453 performs this translation. The translation is based on the standards of the two buses and is performed in a conventional manner.

After executing a transaction on I/O bus 402, I/O bus interface 450 waits for a response from the target agent. Upon receipt of this response, bus interface 450 returns the response to bus master control 425. The handling of this response by I/O bus master control 425 is described above.

I/O bus interface 450 also receives requests from I/O bus 402. These requests originate from an agent on I/O bus 402 and target an agent on processor bus 401. In one mode, bus interface 450 translates the commands received from I/O bus 402 before transferring them to processor bus 401. These requests are then transferred to I/O bus target control 445 by bus interface 450. How these requests are handled by bus target control 445 is described in more detail below.

Deferred reply generator 440 receives deferred replies from I/O bus master control 425. Deferred reply generator 440 then transfers these deferred replies to inbound request queue 430. FIG. 4 also shows a multiplexer 442 which receives input from deferred reply generator 440 and I/O bus target control 445. Multiplexer 442's output is input to inbound request queue 430. Multiplexer 442 shows that inbound request queue 430 receives inputs from multiple sources; it should be understood by those skilled in the art that other well-known devices may be used by the present invention in place of a multiplexer.

I/O bus target control 445 is coupled to bus interface 450, inbound request queue 430, and inbound queue allocation unit 435. I/O bus target control 445 receives requests from bus interface 450 which originate on I/O bus 402. Upon receipt of such a request, I/O bus target control 445 accesses inbound allocation unit 435 to determine whether a slot in inbound request queue 430 is available. If a slot in inbound request queue 430 is available, then I/O bus target control 445 transfers the request to inbound request queue 430. However, if a slot is not available, then I/O bus target control 445 issues a response to the originating agent via bus interface 450 that the request could not be completed and must be retried at a later time.

Requests placed in inbound request queue 430 may or may not be successfully completed on processor bus 401. In one embodiment of the present invention, the execution of a request in inbound request queue 430 on processor bus 401 results in one of two possible replies. First, a normal completion reply may be returned from the target agent on processor bus 401. In this situation, the completion signals (along with any associated data) are returned to the agent originating the request on I/O bus 402. The second possible reply is a retry. In this situation, the target agent on processor bus 401 issues a retry to the request, indicating it is not ready to service the request and it must therefore be retried. This retry reply is returned to the originating agent on I/O bus 402, thereby informing the agent it should retry the request again at a later time.

Figure 7:
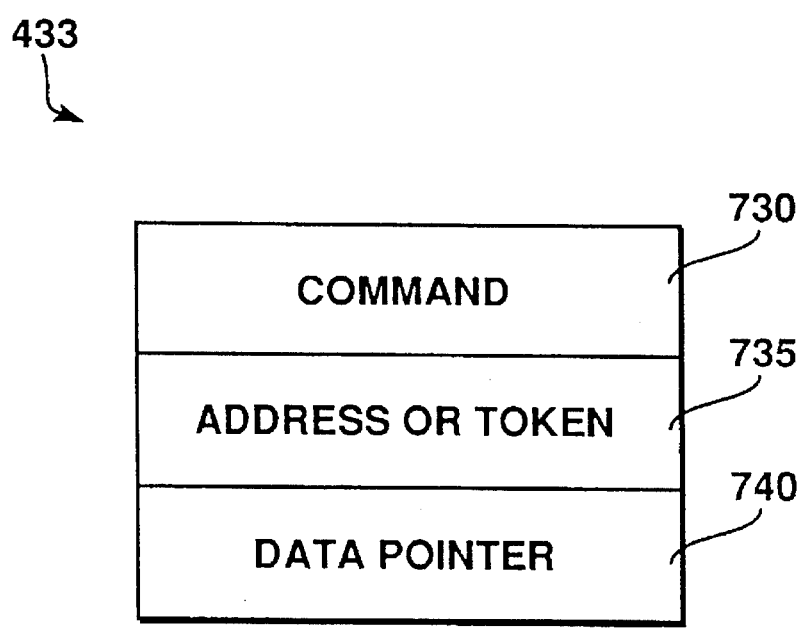
FIG. 7 is a diagram showing the contents of a slot within the inbound queue of one embodiment of the present invention.

Inbound request queue 430 is comprised of multiple slots 433, as shown. In one embodiment, inbound request queue 430 contains four such slots. An exemplary slot 433 is shown in FIG. 7. The slot 433 contains three portions; a command portion 730, an address portion 735, and a data pointer 740. In one implementation, command portion 730, address portion 735, and data pointer 740 comprise the same number of bits as the analogous portions of outbound slot 423 in FIG. 6.

Returning to FIG. 7, command portion 730 contains the command which must be executed on processor bus 401. In the event of a request originating on I/O bus 402, command portion 730 contains the command executed by the originating agent (as translated by bus interface 450). In the event of a request originating on processor bus 401 which was deferred, the command contained in command portion 730 is a command indicating a deferred reply for the original deferred request.

Address portion 735 contains the address of the target agent on processor bus 401 (or a location within the target agent on processor bus 401). Note that in the event of a deferred reply, the address in address portion 735 is replaced by the token front the originating agent. Data pointer 740 contains a pointer to a data buffer which contains the data associated with this command, assuming such data exists. The use of data pointer 740 is as described above with respect to data pointer 625 in FIG. 6.

It should be noted that under certain circumstances, a transaction from I/O bus 402 to processor bus 401 may contain more data than can be placed into a data buffer. In such a situation, the transaction is split according to the size of the data buffer and is placed into multiple slots within the inbound request queue. In one mode, I/O bus target control 445 determines the number of slots required for the transaction and must determine whether that number is available. In an alternate mode, I/O bus target control 445 splits the transaction and places the portions of the transaction into inbound request queue 430 as queue slots become available.

Returning to FIG. 4, inbound queue allocation unit 435 is shown coupled to decoder 415, inbound request queue 430, and I/O bus target control 445. Inbound queue allocation unit 435 is responsible for allocating the inbound request queue slots 430 between deferred replies and transactions originating on I/O bus 402. Allocation unit 435 maintains a count of the number of slots in inbound request queue 430 and dynamically allocates these slots. Thus, inbound queue allocation unit 435 monitors inbound request queue 430 and updates its count of available slots when requests (or responses) are removed from the inbound request queue 430. In one mode, inbound queue allocation unit 435 knows whether the slot was used by a deferred response or a request given the command in the slot (i.e., whether it is a request or a response). In addition, the number of request queue slots which are available to decoder 415 for deferred replies may be changed by allocation unit 435 during system operation.

Allocation unit 435 initially allocates one-half of the inbound request queue slots for deferred replies. That is, when decoder 415 requests an inbound request queue slot from allocation unit 435, allocation unit 435 allows decoder 415 access to two of the slots (assuming inbound request queue 430 comprises four slots). This prevents transactions originating on I/O bus 402 from being starved off. When allocation unit 435 allocates a slot to decoder 415 for a deferred reply, allocation unit 435 essentially prohibits any transaction originating on I/O bus 402, or any other transaction originating on processor bus 401, from utilizing that slot. Thus, the deferred request is guaranteed to have a slot in the inbound request queue when deferred reply generator 440 attempts to place the request's reply into inbound request queue 430.

Similarly, when I/O bus target control 445 requests a queue slot from inbound queue allocation unit 435, allocation unit 435 allows bus target control 445 access to only one-half of the slots. Subsequent requests for slots by bus target control 445 are denied (and the corresponding transactions re-tried) until one of the slots which bus target control 445 placed a request into is freed.

In one embodiment, inbound queue allocation unit 435 dynamically allocates the slots in inbound request queue 430. This enables allocation unit 435 to allocate additional slots to I/O bus target control 445 in the event of heavy traffic originating on I/O bus 402. That is, rather than allowing decoder 415 to defer two transactions, inbound queue allocation 435 could allow decoder 415 to defer only a single transaction and allow I/O bus target control 445 access to three of the slots in the inbound request queue 430. Note that this improves system performance by not unnecessarily reserving inbound request queue slots for deferred replies.

When inbound request queue 430 is full, all transactions originating on I/O bus 402 are retried; in addition, all requests originating on processor bus 401 are not deferred. When a slot in inbound request queue 430 becomes available, by having one of the transactions pending in the queue being executed on processor bus 401, inbound queue allocation unit 435 allocates the slot to either decoder 415 or I/O bus target control 445. In one embodiment, allocation unit 435 gives preference for ownership of the newly released slot to decoder 415. Thus, in the event of simultaneous transactions originating on processor bus 401 and I/O bus 402 (i.e., both decoder 415 and I/O bus target control 445 are requesting a slot in the inbound request queue 430 at the same time), allocation unit 435 gives the slot to decoder 415. In this embodiment, if decoder 415 does not have a transaction which currently requests a slot in the inbound request queue 430, then allocation unit 435 allows I/O bus target control 445 to have ownership of the slot.

It should be noted that in one embodiment of the present invention processor bus 401 has a bandwidth of 500 MBytes/sec while I/O bus 402 has a bandwidth of 125 MBytes/sec. Thus, in a situation when many agents on both buses are issuing transactions, requests arrive at bus interface 410 much more rapidly then requests arrive at bus interface 450. In such a situation, it is more likely that decoder 415 will have a transaction requesting an inbound request queue slot from allocation unit 435. However, circumstances may exist where more requests are being issued by agents on I/O bus 402 than by agents on processor bus 401. Under these circumstances, it is more likely that I/O bus target control 445 will have a transaction requesting an inbound request queue slot from allocation unit 435.

In one embodiment of the present invention, bridge 400 issues a deferred reply only for read requests targeting I/O bus 402. A write request received by bridge 400 is either re-tried (if no outbound request queue slots are available), posted, or attempted on I/O bus 402. "Posted" refers to the command entering the outbound request queue and the originating agent receiving a response that the request will be attempted on I/O bus 402. When the request is not posted, it may still be attempted on I/O bus 402. That is, the Response Phase of processor bus 401 is stalled until the request is retrieved from the top of outbound request queue 420, attempted on I/O bus 402, and a reply is returned to the originating agent.

In one embodiment, write posting can be enabled or disabled. If write posting is enabled, then bridge 400 posts write requests in outbound request queue 420 (assuming a slot in outbound request queue 420 is available). If write posting is not enabled, then bridge 400 attempts the request on I/O bus 402 (when the request is at the top of outbound request queue 420) while stalling the Response Phase of processor bus 401.

In one mode, whether write posting is enabled is a 1-bit configuration value stored in configuration registers 412 in bridge 400. In one mode, write posting is enabled when the 1-bit configuration value is "1", and disabled when it is "0". Write posting can be changed during system operation by altering this configuration value stored in registers 412.

A bus bridge must guard against the possibility of deadlock situations. Two important deadlock situations may arise: (1) a deadlock within the bridge itself, and (2) a deadlock situation between two bridges. In the first situation, a potential deadlock situation arises if both the outbound and inbound request queues are full and the request at the top of the outbound request queue is deferred. Processor bus 401 is completely stalled when the outbound request queue is full because any transactions on the bus may target the bridge, which can not store them. Since processor bus 401 is stalled, the inbound request queue cannot transfer requests to processor bus 401. Furthermore, the deferred reply for the request at the top of the outbound request queue cannot be placed into the inbound request queue because the inbound request queue is full. Thus, neither the request at the top of the inbound request queue nor the top of the outbound request queue can be executed, and the system is deadlocked.

In the second situation, a deadlock situation occurs in a system with two bridges coupled to the same buses. For example, bridge A needs to convert a deferred read response into a deferred reply. The deferred reply needs the inbound request queue. However, the inbound request queue of bridge A is full and has a posted write at the top pointed at bridge B, while the outbound request queue of bridge B is full and has a deferred response at the top waiting for an inbound request queue slot for the deferred reply. If the inbound request queue of bridge B is full and has a posted write at the top pointed at bridge A, none of the queues can advance and the system is deadlocked.

It can be seen that by maintaining forward progress on processor bus 401, both deadlock situations are avoided. Forward progress is ensured by reserving a deferred reply slot in the inbound request queue at the time the request is placed in the outbound request queue. This reserved slot is used for the reply to the deferred request, as described above.

Figure 5:
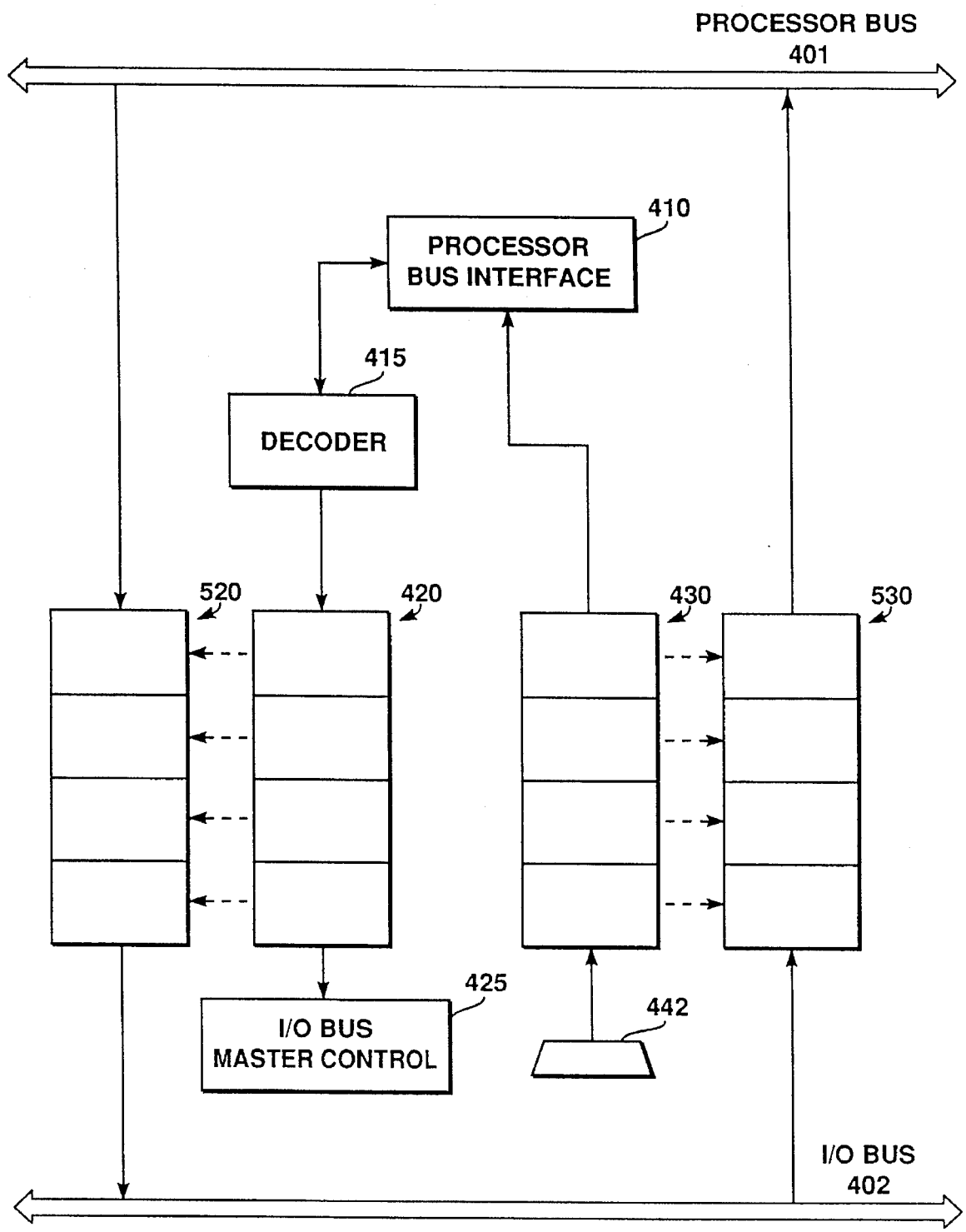
FIG. 5 is a diagram showing an example association between the queue and data buffers in one embodiment of the present invention.

FIG. 5 is a diagram showing example data buffers and corresponding request queues in one embodiment of the present invention. Outbound data buffers 520 contain outbound data (i.e., data being transferred from processor bus 401 to I/O bus 402), and inbound data buffers 530 contain inbound data (i.e., data being transferred from I/O bus 402 to processor bus 401). In the example shown, outbound data buffers 520 correspond to outbound request queue 420, and inbound data buffers 530 correspond to inbound request queue 430. However, it will be understood by those skilled in the art that particular slots of inbound request queue 430 could correspond to one of the outbound data buffers 520 (e.g., in the event of a read request originating on I/O bus 402, reading data from a target agent on processor bus 401). Similarly, particular slots of outbound request queue 420 could correspond to one of the inbound data buffers 530 (e.g., in the event of a deferred read request from an agent on processor bus 401 targeting an agent on I/O bus 402). In one mode, the number of data buffers equals the number of slots in queues 420 and 430.

The data buffers shown in FIG. 5 correspond to the queue slots on a one-to-one basis. That is, a single data buffer exists for each queue slot. It should be understood by those skilled in the art that these numbers may be changed. That is, the number of data buffers may be increased or decreased within the spirit and scope of the present invention.

As discussed above with respect to FIGS. 6 and 7, the data buffers contain any data corresponding to the commands in the queues 420 and 430. A command in one of the queues 420 or 430 which has data associated with it (e.g., a write command, or the response to a read command) will have a data pointer indicating the data buffer containing this data. In one mode, the data pointer is the address of the data buffer corresponding to the particular slot in the queue. The proper address (or other indicator) to place in the data pointer portion to identify the correct data buffer for a slot in outbound request queue 420 is determined by the outbound request decoder 415. In one mode, each data buffer always corresponds to the same slot in the queue. Similarly, the proper indicator to identify the correct data buffer for a slot in inbound request queue 430 is determined by either deferred reply generator 440 or I/O bus target control 445, depending on where the request originated. In an alternate mode, the proper data buffer is dynamically allocated (by decoder 415, reply generator 440, or target control 445 as above) based on the next available buffer when the request is placed into queue 420 or 430.

In one embodiment of the present invention, each data buffer is capable of storing 32 bytes of data. In one mode, the size of each data buffer is the same as the size of a cache line in the computer system. It should be understood by those skilled in the art, however, that the size of a data buffer may be modified; furthermore, each data buffer may be of a different size.

In an alternate embodiment, a single set of data buffers exists which is shared by both queues 420 and 430. In this embodiment, additional logic is required to properly allocate buffers between inbound request queue 430 and outbound request queue 420.

Figure 8A:
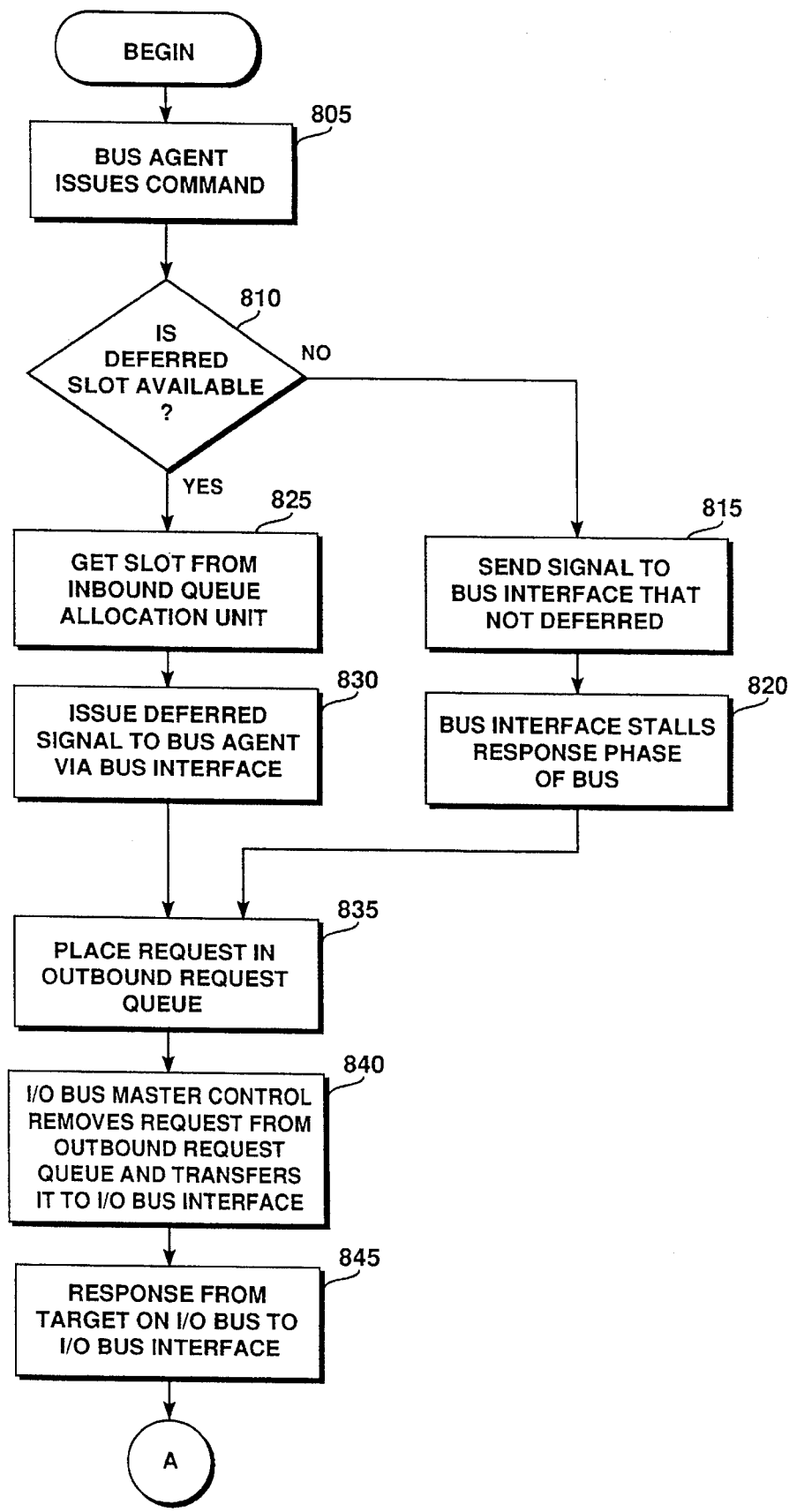
FIGS. 8a and 8b show a flowchart describing the steps followed for a request issued on a bus in one embodiment of the present invention.
Figure 8B:
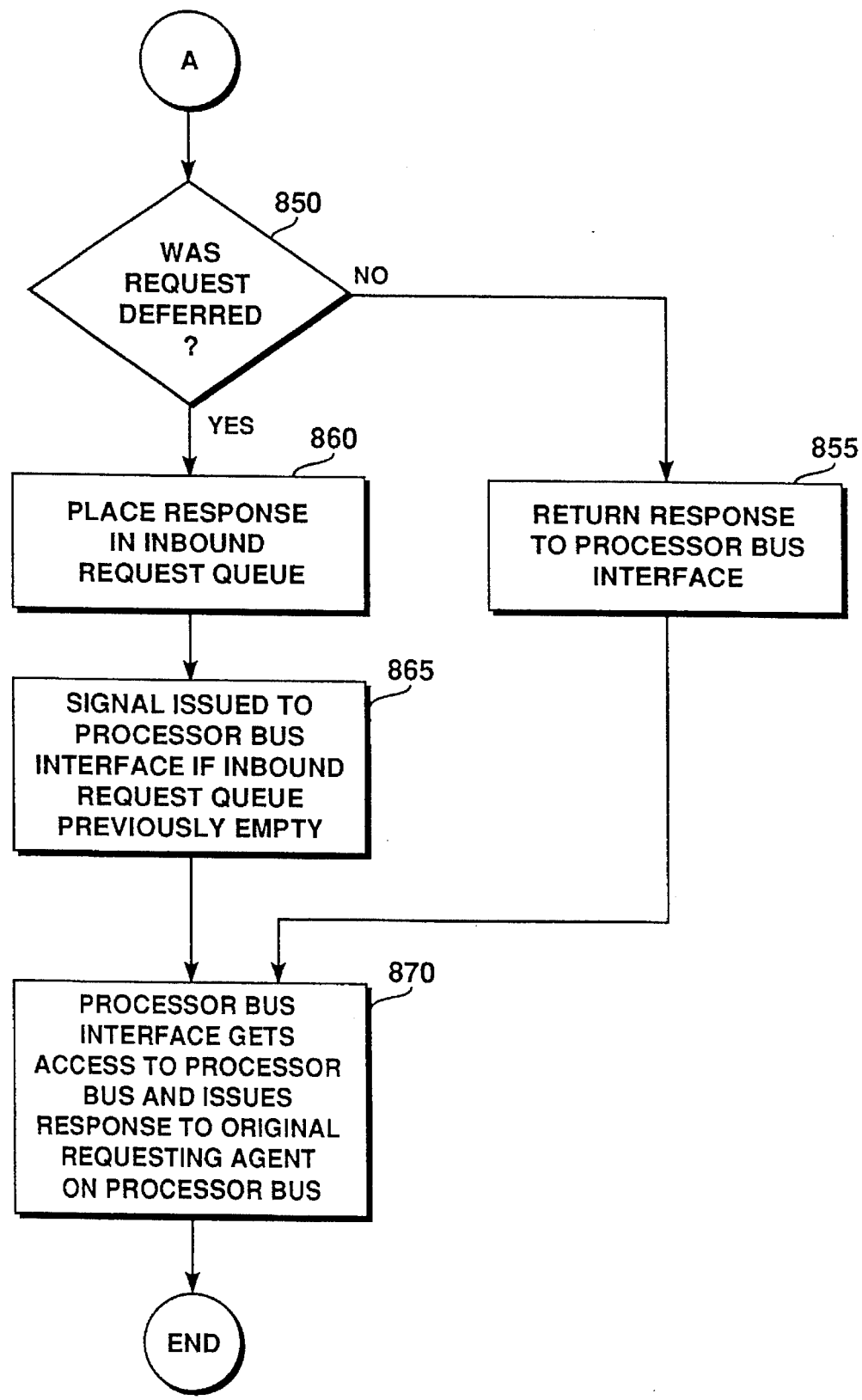

FIGS. 8a and 8b show a flowchart describing the steps followed for a request issued on the processor bus in one embodiment of the present invention. The originating agent issues the command targeting an agent on the I/O bus, step 805. The processor bus interface of the bus bridge receives the command and immediately transfers it to the outbound request decoder, which in turn immediately determines whether a deferred slot is available in the inbound request queue step 810. If no deferred slot is available, then the decoder sends a signal to the bus interface that the request was not deferred, step 815. In response, the bus interface issues a signal over the processor bus to stall the Response Phase of the bus, 820.

Returning to step 810, if the decoder determines that a deferred slot is available, then the inbound queue allocation unit allocates that slot to the decoder, step 825. In response, the decoder issues a signal to the bus interface indicating that the request was deferred, step 830.

Regardless of whether a deferred slot was available in step 810, the decoder places the request into the outbound request queue, step 835. When the request reaches the top of the outbound request queue, the I/O bus master control unit removes the request from the queue and transfers it to the I/O bus interface, step 840. The bus interface executes the command on the I/O bus, and wait for a response from the target agent, step 845. This response is then returned to the I/O bus master control.

The I/O bus master control then determines whether the original request was deferred, step 850. If the original request was not deferred than the I/O bus master control returns the response directly to the processor bus interface, step 855.

If, however, the original request was deferred, then the I/O bus master control transfers the reply to the inbound request queue via the deferred reply generator, step 860. If the inbound request queue had been previously empty, then the inbound request queue issues a signal to the processor bus interface indicating that it contains pending transaction(s), step 865.

Regardless of whether the request was deferred, the processor bus interface receives the reply, step 870. This may be from either the inbound request queue (in the case of a deferred reply request) or directly from the I/O bus master control (in the response phase of the original request). Upon receiving the reply, or the signal from the inbound request queue that it contains a pending transaction, the processor bus interface arbitrates for access to the processor bus. Upon receiving ownership of the processor bus, the processor bus interface transfers the reply to the originating agent on the processor bus.

It should be noted that in an alternate embodiment of the present invention, deferred responses are an option which can be enabled or disabled. In this alternate embodiment, a read request which is placed into the outbound request queue is not deferred. The Response Phase of the processor bus is stalled until a response to the read request is received, as described above. In one mode, whether deferred responses are enabled is a 1-bit configuration value stored in configuration registers 412 in bridge 400. Thus, deferred responses can be enabled and disabled during system operation by setting or clearing this 1-bit configuration value.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for maintaining transaction ordering and supporting deferred replies in a bus bridge has been described.

What is claimed is:

1. A bus bridge for transferring data between a first bus and a second bus in a computer system, the bus bridge comprising:

a first bus interface coupled to the first bus for receiving data from and placing data onto the first bus;

a second bus interface coupled to the second bus for receiving data from and placing data onto the second bus;

an inbound request queue and an outbound request queue coupled to the first bus interface and the second bus interface;

decoding circuitry coupled to the inbound request queue and the outbound request queue for placing requests in the outbound request queue and for issuing a deferred response to the first bus interface to be placed on the first bus based on available space in the inbound request queue; and an inbound queue allocation unit for determining whether an outbound request may be given the deferred response.

2. The bus bridge as defined in claim 1 further comprising at least one data buffer coupled to the inbound request queue and the outbound request queue.

3. The bus bridge as defined in claim 1 wherein the inbound request queue has a plurality of inbound slots and the inbound queue allocation unit determines whether the outbound request may be given the deferred response based on a total number of inbound slots, a number of inbound slots in the inbound request queue currently holding information, and a number of inbound slots in the inbound request queue currently labeled as deferred reply slots.

4. The bus bridge as defined in claim 1 further comprising bus control circuitry coupled to the first bus interface and the second bus interface, the bus control circuitry for determining whether an outbound request has been deferred, transferring the outbound request to the second bus interface, receiving response information from the second bus interface generated in response to the outbound request, and returning the response information to the first bus interface if the outbound request has not been deferred, and transferring the response information to the inbound request queue if the outbound request has been deferred.

5. The bus bridge as defined in claim 4 further comprising a deferred reply generator for receiving response information from the bus control circuitry and transferring the response information to the inbound request queue.

6. The bus bridge as defined in claim 1 further comprising bus target circuitry for receiving inbound requests from the second bus interface and transferring the inbound requests to the inbound request queue.

7. The bus bridge as defined in claim 1 wherein the outbound request queue has a plurality of outbound slots, and wherein each slot of the plurality of outbound slots contains information corresponding to requests issued by agents coupled to the first bus.

8. The bus bridge as defined in claim 1 wherein the inbound request queue has a plurality of inbound slots, and wherein each slot of the plurality of inbound slots stores information corresponding to requests issued by agents coupled to the first bus or the second bus.

9. The bus bridge as defined in claim 8 wherein at least one of the plurality of inbound slots is a deferred reply slot.

10. The bus bridge as defined in claim 1, wherein:

the first bus has a first command protocol;

the second bus has a second command protocol; and the second bus interface is for translating commands between the first command protocol and the second command protocol.

11. The bus bridge as defined in claim 7, wherein each slot of the plurality of outbound slots comprises a tag portion, a command portion, an address portion, and a data pointer portion.

12. The bus bridge as defined in claim 8 wherein each slot of the plurality of inbound slots comprises a command portion, an address portion, and a data pointer portion.

13. A bus bridge for transferring data between a first bus and a second bus in a computer system, the bus bridge comprising:

a first bus interface coupled to the first bus for receiving data from and placing data onto the first bus;

a second bus interface coupled to the second bus for receiving data from and placing data onto the second bus;

an inbound request queue and an outbound request queue coupled to the first bus interface and the second bus interface, wherein the inbound request queue has a plurality of inbound slots, and wherein each slot of the plurality of inbound slots stores information corresponding to requests issued by agents coupled to the first bus or the second bus; and decoding circuitry coupled to the inbound request queue and the outbound request queue for placing requests in the outbound request queue and for issuing a deferred response to the first bus interface to be placed on the first bus based on available space in the inbound request queue, wherein the decoding circuitry determines whether to issue the deferred response to the first bus interface based on whether each inbound slot of the plurality of inbound slots contains information, the decoding circuitry issuing the deferred response to the first bus interface if an inbound slot does not contain information.

14. The bus bridge as defined in claim 11 wherein the tag portion identifies whether a request has been deferred.

15. A method for transferring a command between a first bus and a second bus using a bus bridge, the bus bridge including an inbound request queue and an outbound request queue, the method comprising the steps of:

(a) transferring a first outbound request from a source agent on the first bus to the outbound request queue;

(b) determining whether the first outbound request is to be deferred;

(c) issuing a deferred response to the source agent and reserving a slot in the inbound request queue when the first outbound request is deferred;

(d) transferring the first outbound request from the outbound request queue to a target agent on the second bus; and (e) returning response information from the target agent to the source agent if the first outbound request is not deferred, and placing the response information from the target agent into the inbound request queue if the first outbound request is deferred.

16. The method of claim 15 wherein the step (d) comprises removing the first outbound request from the outbound request queue and transferring the first outbound request to a second bus interface.

17. The method of claim 15 wherein the step (c) comprises:

determining a number of slots in the inbound request queue;

determining a number of slots in the inbound request queue which are not currently in use;

determining a number of slots in the inbound request queue which are currently labeled as deferred reply slots; and issuing the deferred response if an inbound slot exists which is not in use and fewer than a predetermined number of inbound slots are labeled as deferred reply slots.

18. The method of claim 15 wherein the step (d) comprises translating the first outbound request from a first command protocol to a second command protocol.

19. The method of claim 15 further comprising transferring a second outbound request from the outbound request queue to a second target agent on the second bus and transferring response information for the second outbound request to the source agent before the response information for the first outbound request is transferred to the inbound request queue.

20. The method of claim 15 wherein the step (e) comprises placing response data in a data buffer if the target agent returns response data, the inbound request queue containing an indicator denoting a location of the data buffer.

21. The method of claim 15 wherein the step (c) comprises determining whether a deferred reply slot in the inbound request queue is available and issuing the deferred response if the deferred reply slot in the inbound request queue is available.

22. A computer system comprising:

a bus bridge for transferring data between a first bus and a second bus;

the first bus for transferring data between a first agent coupled to the first bus and the bus bridge;

the second bus for transferring data between a second agent coupled to the second bus and the bus bridge; and the bus bridge including, a first bus interface coupled to the first bus for receiving data from and placing data onto the first bus, a second bus interface coupled to the second bus for receiving data from and placing data onto the second bus, an inbound request queue and an outbound request queue coupled to the first bus interface and the second bus interface, decoding circuitry coupled to the inbound request queue and the outbound request queue for placing requests in the outbound request queue and for issuing a deferred response to the first bus interface to be placed on the first bus based on available space in the inbound request queue, and an inbound queue allocation unit for determining whether an outbound request may be given the deferred response.

23. The computer system as defined in claim 22 wherein the inbound request queue has a plurality of inbound slots and the inbound queue allocation unit determines whether the outbound request may be given the deferred reply based on a total number of inbound slots, a number of inbound slots in the inbound request queue currently holding information, and a number of inbound slots in the inbound request queue currently labeled as deferred reply slots.

24. The computer system as defined in claim 22 wherein the bus bridge further comprises bus control circuitry coupled to the first bus interface and the second bus interface, the bus control circuitry being for determining whether an outbound request has been deferred, transferring the outbound request to the second bus interface, receiving response information from the second bus interface generated in response to the outbound request, and returning the response information to the first bus interface if the outbound request has not been deferred, and transferring the response information to the inbound request queue if the outbound request has been deferred.

25. The computer system as defined in claim 22 wherein the bus bridge further comprises bus target circuitry for receiving inbound requests from the second bus interface and transferring the requests to the inbound request queue.

26. The computer system as defined in claim 22 wherein the outbound request queue has a plurality of outbound slots, and wherein each slot of the plurality of outbound slots holds information corresponding to requests issued by agents coupled to the first bus.

27. The computer system as defined in claim 26, wherein each slot of the plurality of outbound slots comprises a tag portion, a command portion, an address portion, and a data pointer portion.

28. The computer system as defined in claim 22 wherein the inbound request queue has a plurality of inbound slots, and wherein each slot of the plurality of inbound slots stores information corresponding to requests issued by agents coupled to the first bus or the second bus.

29. The computer system as defined in claim 28 wherein each slot of the plurality of inbound slots comprises a command portion, an address portion, and a data pointer portion.

30. A computer system comprising:

a bus bridge for transferring data between a first bus and a second bus;

the first bus for transferring data between a first agent coupled to the first bus and the bus bridge;

the second bus for transferring data between a second agent coupled to the second bus and the bus bridge; and the bus bridge including, a first bus interface coupled to the first bus for receiving data from and placing data onto the first bus, a second bus interface coupled to the second bus for receiving data from and placing data onto the second bus, an inbound request queue and an outbound request queue coupled to the first bus interface and the second bus interface, wherein the inbound request queue has a plurality of inbound slots, and wherein each slot to the plurality of inbound slots stores information corresponding to requests issued by agents coupled to the first bus or the second bus, and decoding circuitry coupled to the inbound request queue and the outbound request queue for placing requests in the outbound request queue and for issuing a deferred response to the first bus interface to be placed on the first bus based on available space in the inbound request queue, wherein the decoding circuitry determines whether to issue the deferred response to the first bus interface based on whether each inbound slot of the plurality of inbound slots contains information, the decoding circuitry issuing the deferred response to the first bus interface if an inbound slot does not contain information.

31. An apparatus for transferring commands between a first bus and a second bus, the apparatus including an inbound request queue and an outbound request queue, the apparatus comprising:

means for transferring a first outbound request from a source agent on the first bus to the outbound request queue;

means for determining whether the first outbound request is to be deferred;

means for issuing a deferred response to the source agent and reserving a slot in the inbound request queue when the first outbound request is deferred;

means for transferring the first outbound request from the outbound request queue to a target agent on the second bus; and means for returning response information from the target agent to the source agent if the first outbound request is not deferred, and placing the response information from the target agent into the inbound request queue if the first outbound request is deferred.

32. The apparatus as defined in claim 31 wherein the means for transferring comprises means for removing the first outbound request from the outbound request queue and transferring the first outbound request to a second bus interface.

33. The apparatus as defined in claim 31 wherein the means for issuing a deferred response comprises:

means for determining a number of slots in the inbound request queue;

means for determining a number of slots in the inbound request queue which are not currently in use;

means for determining a number of slots in the inbound request queue which are currently labeled as deferred reply slots; and means for issuing the deferred response if an inbound slot exists which is not in use and fewer than a predetermined number of inbound slots are labeled as deferred reply slots.

34. The apparatus as defined in claim 31 wherein the means for transferring the first outbound request from the outbound request queue to a target agent on the second bus comprises means for translating the first outbound request from a first command protocol to a second command protocol.

35. The apparatus as defined in claim 31 further comprising means for transferring a second outbound request from the outbound request queue to a second target agent on the second bus, and transferring response information for the second outbound request to the source agent before the response information for the first outbound request is transferred to the inbound request queue.

36. The apparatus as defined in claim 31 wherein the means for returning further comprises means for placing response data in a data buffer if the target agent returns response data, the inbound request queue containing an indicator denoting a location of the data buffer.

37. The apparatus as defined in claim 31 wherein the means for issuing a deferred response comprises means for determining whether a deferred reply slot in the inbound request queue is available and issuing the deferred response if the deferred reply slot in the inbound request queue is available.

* * * * *

UNITED STATES PATENT AND TRADEMARK OFFICE
CERTIFICATE OF CORRECTION

PATENT NO.  : 5,535,340
DATED       : July 9, 1996
INVENTOR(S) : Bell et al.

It is certified that error appears in the above-identified patent and that said Letters Patent is hereby corrected as shown below:

In column 6 at line 22 delete "front" and insert --from--

In column 7 at line 34 delete "tip" and insert --up--

In column 8 at line 11 delete "i/O" and insert --I/O--

In column 10 at line 33 delete "front" and insert --from--

In column 10 at line 38 delete "arc," and insert --are--

In column 13 at line 41 delete "front" and insert --from--

Signed and Sealed this

Eighth Day of April, 1997

Attest:

BRUCE LEHMAN

Attesting Officer

Commissioner of Patents and Trademarks